United States Patent [19]
Karsten et al.

[11] 4,094,157
[45] June 13, 1978

[54] ANCHORING APPARATUS FOR ANCHORING A MINING INSTALLATION

[75] Inventors: Werner Karsten, Gelsenkirchen; Helmut Erwien, Lünen, both of Germany

[73] Assignee: Gewerkschaft Eisenhutte Westfalia, Germany

[21] Appl. No.: 747,434

[22] Filed: Dec. 3, 1976

[30] Foreign Application Priority Data

Dec. 5, 1975  Germany .............................. 2554690

[51] Int. Cl.² .................... E21D 20/00; E21D 21/02
[52] U.S. Cl. ........................................ 61/63; 61/45 B; 299/31
[58] Field of Search ..................... 61/45 C, 63, 84, 85; 299/31, 32; 173/32, 33

[56] References Cited

U.S. PATENT DOCUMENTS

| 1,687,306 | 10/1928 | O'Toole | 299/31 X |
| 2,842,341 | 7/1958 | Wink | 173/32 |
| 3,995,907 | 12/1976 | Dubois | 299/31 |

FOREIGN PATENT DOCUMENTS 1,081,845  5/1960  Germany .............................. 173/32

Primary Examiner—Dennis L. Taylor
Attorney, Agent, or Firm—Charles E. Pfund

[57] ABSTRACT

Apparatus for anchoring a mining installation to the floor of a mining excavation includes an anchor beam and at least one anchoring element which is anchored in a borehole in the floor of the mining excavation. Each anchoring element is provided with a respective tensioning device for prestressing that anchoring element. Each tensioning device comprises a freely pivotable support member on which is arrayed an adjustable anchoring element connection element.

14 Claims, 3 Drawing Figures

ANCHORING APPARATUS FOR ANCHORING A MINING INSTALLATION

BACKGROUND OF THE INVENTION

This invention relates to anchoring apparatus for anchoring a mining installation such as a conveyor and/or a coal-winning installation for use in underground mining operations.

Known anchoring apparatus includes an anchor beam which is secured in position by means of anchoring elements which are anchored in the floor of a mining excavation and which can be prestressed with the aid of tensioning devices. Such apparatus is provided, particularly where a coal seam has a large dip, for anchoring a longwall conveyor and coal-winning installation in, or in the area of, the top roadway leading to the longwall face. In this connection it is known to secure the anchor beam in position using hydraulic anchor props or anchoring elements which are anchored in the floor. The use of anchoring elements has the advantage that the cross-section of the roadway is not blocked as is the case when hydraulic anchor props are used. Moreover, anchoring elements allow firm anchoring of the anchor beam even where the floor is composed of friable rock. It is, however, necessary to provide boreholes in the floor, the anchoring elements being inserted into the boreholes and encased in concrete or secured in some other way. In this connection it is necessary to ensure that the boreholes are drilled in the correct positions and at the correct inclinations in order to ensure that the anchoring forces are transmitted through the prestressed anchoring elements into the floor rock.

It is the primary object of the invention to provide anchoring apparatus for anchoring a mining installation, particularly a conveyor and coal-winning installation for use in longwall operations, which, without exact positioning and the installation of the boreholes allows safe anchoring of the anchor beam, and at the same time permits simple and reliable prestressing of the anchoring elements independently of the actual inclination of the boreholes.

SUMMARY OF THE INVENTION

Broadly stated, the present invention provides anchoring apparatus for anchoring a mining installation to the floor of a mining excavation, said apparatus comprising:

(a) an anchor beam;
(b) an anchoring element for anchoring in a borehole in said mining excavation floor; and
(c) a tensioning device for prestressing the anchoring element, said tensioning device comprising:
  (i) a support member pivotally mounted with respect to said anchor beam;
  (ii) a connection member connected to said anchoring element, and
  (iii) adjustment means for adjusting the position of said connection member with respect to said support member.

Preferably, said support member is a housing which houses said connection member and supports said adjustment means.

Advantageously, said support member is pivotally mounted in a pivot bearing which permits pivoting about an axis parallel to the longitudinal axis of said anchor beam. Said connection member may be so arranged or constructed that the anchor tensile forces substantially intersect the axis of said pivot bearing no matter what inclination said borehole has.

The main advantage of this anchoring apparatus is that, independently of the inclination of said borehole, said anchoring element tensioning device can automatically adapt itself to the inclination of the borehole, so that favourable transmission of the anchoring force through said anchor beam and said anchoring element into the floor rock is ensured. Moreover, the prestressing of said anchoring element can be carried out safely and quickly over a wide range of borehole inclinations.

Said pivot bearing may be formed in a bracket which is connected to said anchor beam, and preferably, said pivot bearing is formed in the top of said bracket and has an open top side. This permits said anchoring element tensioning device to be removed as a unit from said anchor beam when, for example, said anchor beam is shifted in the course of the face advance. A quicker and simpler connection of this anchoring apparatus to an anchor beam is, therefore, possible when compared with known apparatus.

Advantageously, said connection member is axially adjustable within said housing. Preferably, said adjustment means is constituted by a spindle which is fastened to said connection member, and by a spindle nut which bears against said housing, said spindle projecting outwardly of said housing and being provided with an external screw thread which is engaged by a matching internal screw thread of said spindle nut, whereby said spindle is moved during operation, by rotating said spindle nut so that the position of said connection member is adjusted.

Said connection member may be connected to said anchoring element by a coupling member which is pivotally connected to said connection member and which projects from the underside of said housing. Advantageously, said coupling member has a hook for connection with said anchoring element.

Preferably said anchoring element is constituted by a length of chain. The anchoring apparatus may be provided with a plurality of said anchoring elements, each associated with a respective tensioning device.

BRIEF DESCRIPTION OF THE DRAWINGS

One form of apparatus for anchoring a mining installation and constructed in accordance with the invention, will now be described, by way of example, with reference to the accompanying drawings, in which:

FIG. 3 is a cross-section of part of the anchoring apparatus, showing the anchor beam and the means for attaching an anchoring element.

DESCRIPTION OF PREFERRED EMBODIMENT

Figure 1:
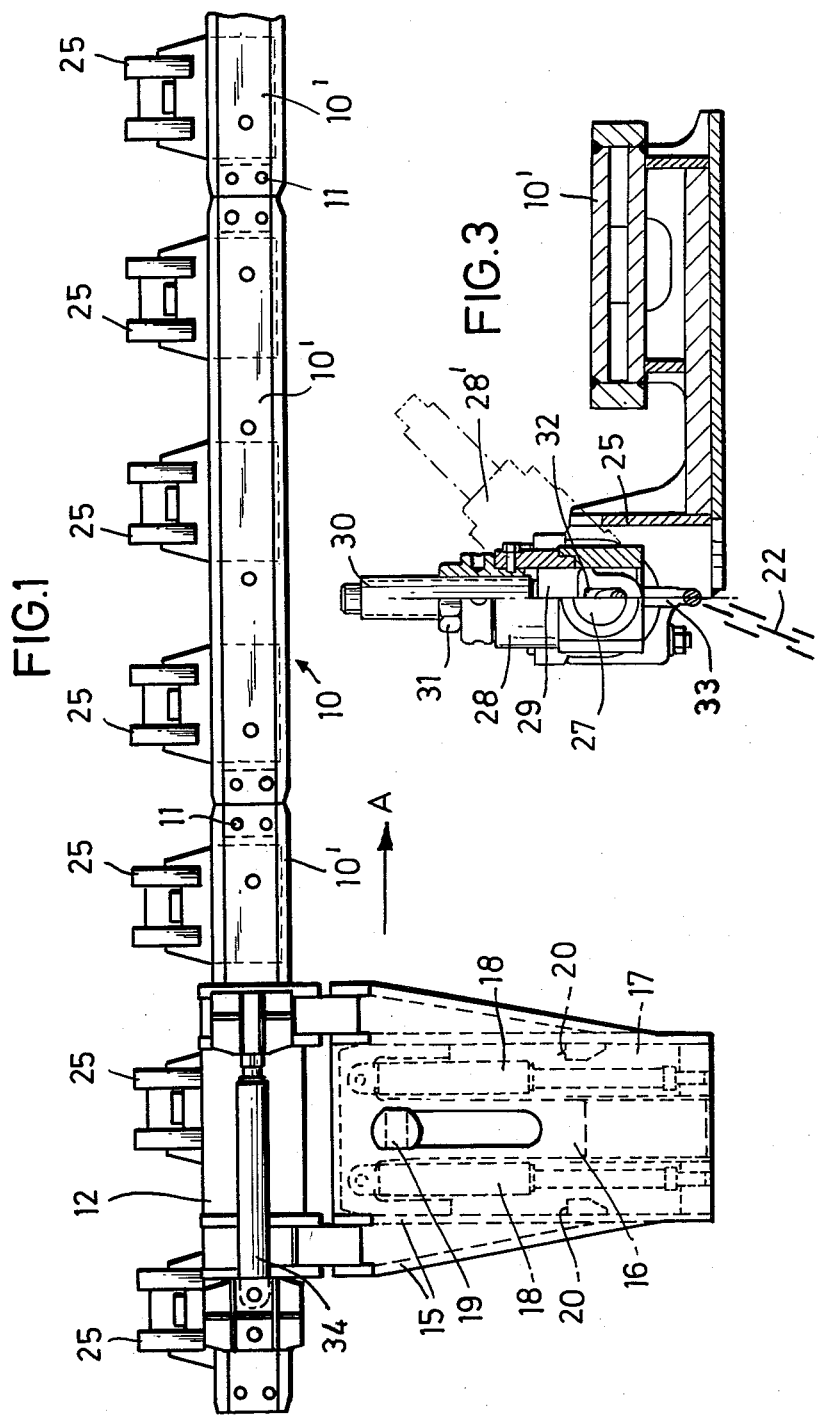
FIG. 1 is a plan view of the anchoring apparatus.
Figure 2:
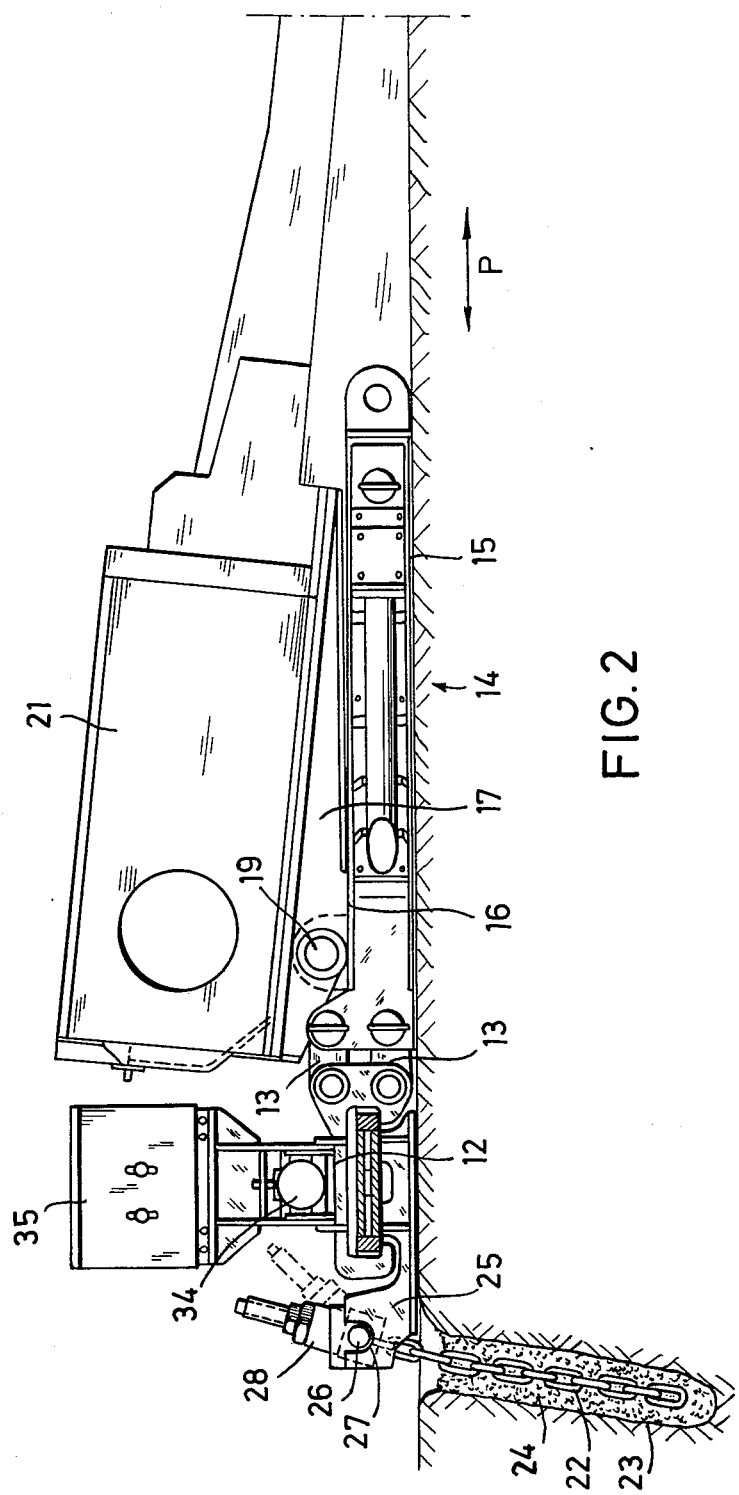
FIG. 2 is a side elevation of the anchoring apparatus.

Referring to the drawings, the anchoring apparatus illustrated is used for anchoring the drive head of a conveyor and/or a coal-winning installation such as a a scraper chain conveyor and a coal plough which is guided on the conveyor. The apparatus comprises an anchor beam 10 which is constituted by a plurality (in this case three) of individual beam sections 10' which are connected end-to-end by means of tongues and detachable locking bolts 11 which constitute articulated joints which permit horizontal and vertical angling of adjacent sections. This ensures that the individual beam sections 10' can be removed separately and can be advanced as the longwall face advances.

A crab 12 is slidably mounted on the anchor beam 10 for movement in the direction A in which the longwall face advances. The crab 12 is arranged to slide on the top side of the anchor beam 10 and is joined, by means of a pair of articulated links 13 to a carriage 14 in such a manner that the carriage can be pivoted in a vertical plane relative to the beam and to the coal. The carriage 14 is constituted by a pair of skids 15 which are supported on the floor, by a slide plate 16 and by an anchor plate 17. Hydraulic rams 18 act between the skids 15 and the slide plate 16 in such a manner that, by subjecting the rams to a change in hydraulic pressure, the slide plate is slidable relative to the skids in the anchoring direction P. The anchor plate 17 is connected to a rod 19 which is pivotally mounted in the slide plate 16. The skids 15 are provided with stop members 20 which serve to support the slide plate 16 so that the rams 18 can be installed and removed in a retracted state.

The drive head of the installation, which is indicated generally by the reference numeral 21, is mounted with its machine frame on the anchor plate 17 so that, by subjecting the rams 18 to an increase in hydraulic pressure, the conveyor and/or coal-winning installation (not shown) can be anchored in the longitudinal direction of the longwall face by means of the slide plate 16.

The crab 12 and the carriage 14 are moved in the direction A of face advance by means of a hydraulic ram 34 which is supported on an interchangeable abutment mounted on the anchor beam 10. The hydraulic rams 18 and 34 are controlled by a control station 35.

The anchor beam 10 is anchored, in the top roadway leading to the longwall face or in the area of the end of the longwall face, by means of anchoring elements 22 (only one of which can be seen in the drawings) constituted by lengths of chain. Instead of lengths of chain, the anchoring elements 22 could each be constituted by a bar, bolt, wire or other generally elongate element. These anchoring elements 22 are anchored in boreholes 23 in the floor by filling the boreholes with a hardenable material such as concrete 24. Preferably, the concrete 24 is a quick-setting concrete. Alternatively, a thermsetting resin such as an epoxy resin could be used in place of the concrete 24.

Each anchoring element 22 is fastened, in a manner described below, to a bracket 25 attached to the anchor beam 10 on that side thereof which is remote from the carriage 14. There are three brackets 25 associated with each beam section 10'. Each of the brackets 25 is substantially fork-shaped in design and comprises a pair of open-ended bearings 26 for the accommodation of a pivot pin 27 whose ends are attached to the housing 28 of a device for tensioning the associated anchoring element 22. Thus, each housing 28 is mounted in its respective bracket 25 in such a way that it can swivel about the axis of its pivot pin 27, this axis extending parallel to that of the anchor beam 10. A connection element 29 is slidably mounted in the housing 28, this connection element being joined to a spindle 30 which projects from the top of the housing 28 and which is threadably engaged with a spindle nut 31 at the upper end of the housing 28. The connection element 29 is provided with an eye 32 into which a coupling member 33 also 33 is pivotally suspended, the coupling member 33 being detachably connected, by means of an ear or a hook to a chain link at the free end of the respective anchoring element 22.

It will be apparent, from FIG. 3, that this anchoring element tensioning device can, owing to free pivotal mounting of its housing 28, adapt itself within comparatively wide limits to different angles of the boreholes 23 accommodating the anchoring elements 22, the tensile forces in the anchoring elements being transmitted through the pivot joints 26, 27 of the tensioning device. For example, the tensioning device is shown at 28' in dash-and-dot lines in the position for taking up the tensile forces from an anchoring element 22 arranged in the floor at an angle of 45° to the vertical, the tensioning device also being swung out to an angle of 45° to the vertical.

The required degree of prestressing of any given anchoring element 22 is effected by turning the spindle nut 31 by means of, for example, a spanner (not shown). This forces the spindle 30 further out of the housing 28 and so pulls the connection element 29 upwardly so as to increase the tension in the anchoring element 22. Obviously, by turning the spindle nuts 31 in the opposite direction, the prestress in the anchoring elements 22 is reduced so that the connection of the anchoring elements to their coupling members 33 may be released.

With this anchoring apparatus, it is possible to prestress the anchoring elements 22 quickly and reliably over a wide range of borehole inclinations. Moreover, the individual tensioning devices can each be easily removed as a unit from its bracket 25 and can be fitted just as easily. The connection of each anchoring element 22 through its coupling means 33 and its connection element 29 ensures that the tensile forces in that anchoring element acts in the longitudinal central axis of the housing 28 of its tensioning device.

We claim:

1. Anchoring apparatus for anchoring a mining installation to the floor of a mining excavation, said apparatus comprising:
   (a) an anchor beam;
   (b) an anchoring element for anchoring in a borehole in said mining excavation floor; and
   (c) a tensioning device for prestressing the anchoring element, said tensioning device comprising:
      (i) a pivot bearing rigidly attached to said beam;
      (ii) a support member pivotally mounted in said pivot bearing which permits pivoting of the support member about an axis parallel to the longitudinal axis of said anchor beam;
      (iii) a connection member connected to said anchoring element; and
      (iv) adjustment means for adjusting the position of said connection member with respect to said support member.

2. Anchoring apparatus according to claim 1, wherein said support member comprises a housing which houses said connection member and supports said adjustment means.

3. Anchoring apparatus according to claim 1, wherein said pivot bearing is formed in a bracket which is connected to said anchor beam.

4. Anchoring apparatus according to claim 3, wherein said pivot bearing is formed in the top of said bracket and has an open top side.

5. Anchoring apparatus according to claim 2, wherein said connection member is axially adjustable within said housing.

6. Anchoring apparatus according to claim 2, wherein said adjustment means is constituted by a spindle which is fastened to said connection member, and by a spindle nut which bears against said housing, said spindle projecting outwardly of said housing and being provided with an external screw thread which is engaged by a matching internal screw thread of said spindle nut, whereby said spindle is moved, during operation, by rotating said spindle nut so that the position of said connection member is adjusted.

7. Anchoring apparatus according to claim 2, wherein said connection member is connected to said anchoring element by a coupling member which is pivotally connected to said connection member and which projects from the underside of said housing.

8. Anchoring apparatus according to claim 7, wherein said coupling member has a hook for connection with said anchoring element.

9. Anchoring apparatus according to claim 1, wherein said anchoring element is constituted by a length of chain.

10. Anchoring apparatus according to claim 1, further comprising:
   (a) a crab longitudinally slidably mounted on said anchor beam; and
   (b) a carriage pivotally connected, for movement in a vertical plane, to said crab.

11. Anchoring apparatus according to claim 10, wherein said carriage is provided with a slide plate which is displacable along skid means by means of hydraulic ram means.

12. Anchoring apparatus for anchoring a mining installation to the floor of a mining excavation, said apparatus comprising:
   (a) an anchor beam;
   (b) a plurality of anchoring elements for anchoring in respective boreholes in said mining excavation floor; and
   (c) a plurality of tensioning devices for prestressing said anchoring elements, there being a respective tensioning device for each anchoring element, wherein each of said tensioning devices comprises:
      (i) a pivot bearing rigidly attached to said beam;
      (ii) a support member pivotally mounted in said pivot bearing which permits pivoting of the support member about an axis parallel to the longitudinal axis of said anchor beam;
      (iii) a connection member connected to said anchoring element; and
      (iv) adjustment means for adjusting the position of said connection member with respect to said support member.

13. Anchoring apparatus for anchoring a mining installation to the floor of a mining excavation, said apparatus comprising:

(a) an anchor beam constituted by a plurality of beam sections joined together end-to-end;
   (b) a plurality of anchor chains associated with each of said beam sections for anchoring in respective boreholes in said mining excavation floor;
   (c) a respective tensioning device for prestressing each of said anchor chains; and
   (d) a respective bracket for attaching each of said tensioning devices to the corresponding one of said beams sections;
   wherein each of said tensioning devices comprises:
      (i) a housing pivotally mounted in a pivot bearing provided on said respective bracket, said pivot bearing permitting pivotting of said housing about an axis parallel to that of said anchor beam;
      (ii) a connection member mounted within said housing and pivotally connected to the corresponding one of said anchor chains by a coupling member; and
      (iii) adjustment means for adjusting the position of said connection member within said housing, said adjustment means being constituted by a spindle fastened to said connection member and by a spindle nut bearing against said housing, said spindle being provided with an external screw thread which is engaged by a matching internal screw thread of said spindle nut, whereby said spindle is moved, during operation, by rotating said spindle nut so that the position of said connection member is adjusted.

14. An anchored mining installation comprising:
   (a) a mining installation;
   (b) an anchor beam fast to said mining installation;
   (c) a plurality of anchoring elements for anchoring in respective boreholes in the floor of a mining excavation; and
   (d) a plurality of tensioning devices for prestressing said anchoring elements, there being a respective tensioning device for each anchoring element;
   wherein each of said tensioning devices comprises:
      (i) a pivot bearing rigidly attached to said beam;
      (ii) a support member pivotally mounted in said pivot bearing which permits pivoting of the support member about an axis parallel to the longitudinal axis of said anchor beam;
      (iii) a connection member connected to said anchoring element; and
      (iv) adjustment means for adjusting the position of said connection member with respect to said support member;
   whereby each tensioning device is independently adjustable to vary the prestress of its corresponding anchoring element.

* * * * *